United States Patent
Buttolo et al.

(10) Patent No.: US 11,480,960 B2
(45) Date of Patent: Oct. 25, 2022

(54) SYSTEMS AND METHODS REMOTE CONTROL OF VEHICLES

(71) Applicant: Ford Global Technologies, LLC, Dearborn, MI (US)

(72) Inventors: Pietro Buttolo, Dearborn Heights, MI (US); John Vincent, Livonia, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 17/090,739

(22) Filed: Nov. 5, 2020

(65) Prior Publication Data
US 2022/0137621 A1     May 5, 2022

(51) Int. Cl.
| | | |
|---|---|---|
| *G05D 1/00* | (2006.01) | |
| *G08G 1/00* | (2006.01) | |
| *B60W 50/14* | (2020.01) | |
| *G01S 19/42* | (2010.01) | |
| *B60W 60/00* | (2020.01) | |

(52) U.S. Cl.
CPC ........... *G05D 1/0038* (2013.01); *B60W 50/14* (2013.01); *B60W 60/001* (2020.02); *G01S 19/42* (2013.01); *G05D 1/0016* (2013.01); *G08G 1/22* (2013.01); *B60W 2420/42* (2013.01)

(58) Field of Classification Search
CPC . G05D 1/0038; G05D 1/0016; B60W 60/001; B60W 50/14; B60W 2420/42; G01S 19/42; G08G 1/22
See application file for complete search history.

(56) References Cited

U.S. PATENT DOCUMENTS

| | | | |
|---|---|---|---|
| 7,731,588 B2 | 6/2010 | Templeman | |
| 2011/0288695 A1* | 11/2011 | Gariepy | G05D 1/0027 |
| | | | 701/2 |

FOREIGN PATENT DOCUMENTS

DE    102018200011 A1    7/2019

OTHER PUBLICATIONS

Gechter et al. "Towards a Hybrid Real/Virtual Simulation of Autonomous Vehicles for Critical Scenarios" Simul 2014 pp. 14-17.

* cited by examiner

*Primary Examiner* — Anne Marie Antonucci
*Assistant Examiner* — Jingli Wang
(74) *Attorney, Agent, or Firm* — Brandon Hicks; Eversheds Sutherland (US) LLP

(57) ABSTRACT

The disclosure describes systems and methods including for monitoring and remotely controlling a fleet of autonomous vehicles. The remote vehicle control system determines a control input to control a vehicle based on an action performed on or with a controller bot. The controller bot is configured for use on a horizontal display that displays a map and a vehicle graphic at a location on the map.

19 Claims, 9 Drawing Sheets

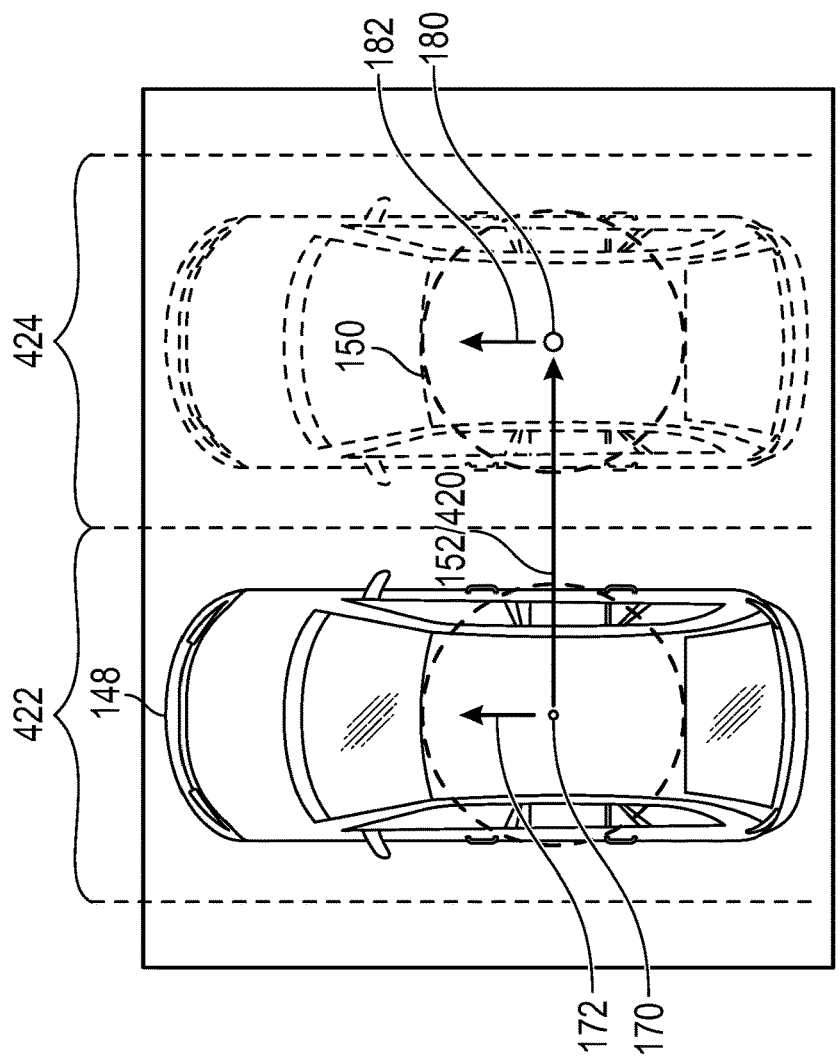
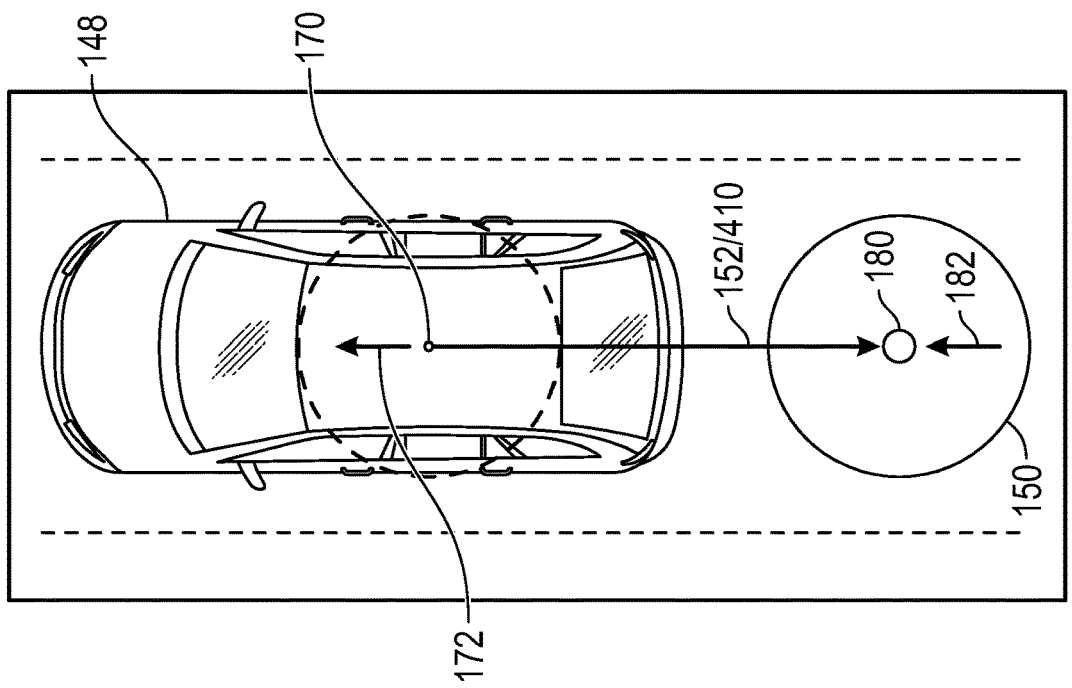

SYSTEMS AND METHODS REMOTE CONTROL OF VEHICLES

BACKGROUND

The number of vehicle miles traveled using ride hailing services is rapidly increasing. Autonomous vehicles (including autonomy levels 1-5) could further increase the share of vehicle miles traveled with ride hailing. Some autonomous vehicles are used in geo-fenced areas with operators on board for data analysis, supervision, and to take over driving responsibilities. Some autonomous vehicles have no human driver on board.

In some instances, to successfully deploy a fleet of autonomous vehicles, the vehicles can be monitored and controlled in case a vehicle needs assistance. Monitoring and controlling a large fleet of vehicles may be difficult for an operator. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used, interchangeably.

FIGS. 8-11 depict actions performed on or with the remote control hot in accordance with the present disclosure.

DETAILED DESCRIPTION

Overview

The systems and methods disclosed herein are configured to remotely control a vehicle.

Figure 1:
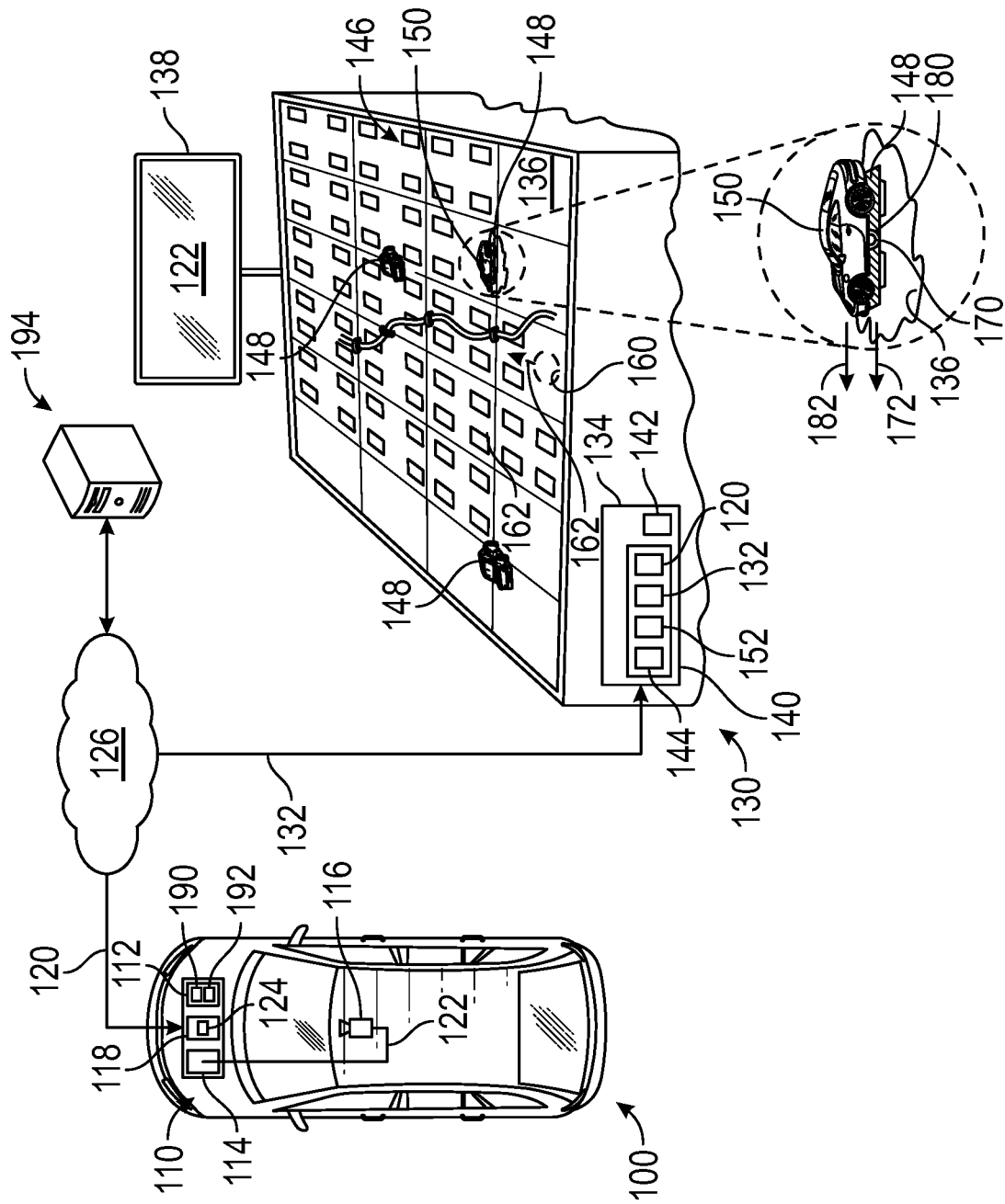
FIG. 1 depicts a vehicle and a remote vehicle control system in accordance with the present disclosure.

Referring to FIG. 1, a vehicle 100 includes a vehicle control system 110. The vehicle control system 110 includes a vehicle computer 112, a camera system 114 including a camera 116, and a navigation (NAV) system 118. The vehicle control system 110 is configured to provide vehicle data 120, including video data 122 from the camera 116 and vehicle location data 124 from the NAV system 118, to a remote vehicle control system. 130 through a network 126.

The vehicle control system 110 is configured to control vehicle systems based on control inputs 132 received from the remote vehicle control system. 130 through the network 126. The remote vehicle control system 130 allows an operator to monitor and control one or more vehicles 100 in an intuitive manner.

The remote vehicle control system 130 includes a remote computer 134, a horizontal display 136 (e.g., a tabletop display), and a vertical display 138. The remote computer 134 includes a memory 140 and a processor 142. The memory 140 includes geospatial data 144 and the processor 142 is configured to compile and format the geospatial data 144 to generate a digital image of a map 146 of a geographical area. The remote vehicle control system 130 displays the map 146 on the horizontal display 136.

The remote vehicle control system 130 further displays vehicle graphics 148 on the map 146. Each vehicle graphic 148 corresponds to a vehicle 100 in a fleet of vehicles 100. The remote vehicle control system 130 receives the vehicle location data 124 (e.g., location, direction, speed) from the NAV system 118 and displays the vehicle graphic 148 on the map 146 based on the vehicle location data 124.

The remote vehicle control system 130 includes controller bots 150 that are configured to move on a surface of the horizontal display 136. The controller bots 150 are configured to link to a vehicle 100, for example, when a vehicle 100 needs assistance. When linked, actions that are performed on or with the controller bot 150 that match a stored control action 152 are configured to generate a control input 132 to control the vehicle 100. For example, each stored control action 152 is associated with a control input 132.

When the controller bot 150 is linked to a vehicle 100, the controller hot 150 may be anchored to the associated vehicle graphic 148, and may follow or track the position and direction of the associated vehicle graphic 148 as it moves on the horizontal display 136. Here, the location and movements of the vehicle 100 within the geographical area can be easily monitored and controlled such that a single operator at the remote vehicle control system 130 can monitor and control a fleet of vehicles.

Alternatively, in some examples, when the controller bot 150 is linked to the vehicle 100, the controller bot 150 is anchored to or positioned with respect to a fixed location 160 and anchored or oriented with respect to a fixed direction 162. Here, the fixed location 160 may provide more convenient access to the controller bot 150 by an operator.

To initiate control of a vehicle 100 through a control bot 150 that is linked to a vehicle 100, the linked control bot 150 may first be selected. For example, the control bot 150 may be tapped or depressed to select the control bot 150. Alternatively, the step of linking the control bot 150 to a vehicle 100 may automatically activate a control mode.

In some examples, when the controller bot 150 is linked or selected, the controller bot 150 and the vehicle graphic 148 are anchored or positioned with respect to the fixed location 160 and anchored or oriented with respect to the fixed direction 162, and the map 146 is generated around the fixed location 160 and oriented in the fixed direction 162 based on the vehicle location data 124.

In some examples, when the controller bot 150 is linked or selected, the video data 122 is displayed on the vertical display 138. In some examples, the video data 122 is displayed in a window on the horizontal display 136. In some examples, the controller bot 150 includes a screen to display the video data 122 from the vehicle 100.

Once the control bot 150 is linked and/or selected to activate a control mode, the remote vehicle control system 130 is configured to perform a method including determining an action performed on or with the control bot 150 and comparing the determined action to a set of stored control actions 152. If the determined action matches one of the set of stored control actions 152, a control input 132 that is associated with the one of the set of stored control actions 152 is selected as a control input for 132 the associated vehicle 100.

The control bot 150 may measure various actions performed on or with the control bot 150 including a direction and an amount of translational movement, a direction and an amount of rotational movement, a number of force inputs and taps, combinations thereof, and the like.

Actions performed on or with the controller bot 150 may be measured relative to the position 170 and orientation (e.g., a forward direction 172) of the vehicle graphic 148 and/or may be measured relative to the fixed location 160 and fixed direction 162. For example, a distance and direction between a position 180 of the controller bot. 150 and position 170 of the vehicle graphic 148 can define at least part of a control action 152. Similarly, an angle between a forward direction 182 of the controller bot 150 and the forward direction 172 of the vehicle graphic 148 may define at least part of a control action 152.

The stored control actions 152 are associated with control inputs 132 to the vehicle 100. Control inputs 132 may include direct control inputs (e.g., related to steering, accelerating, braking) such changing lane, turning left or right, accelerating or decelerating, and the like. Control inputs 132 may also include broader command inputs from which the remote computer 134 or the vehicle computer 112 determines steps to achieve a desired result. Broad command inputs may include a request to pull over, stop at a refueling station, wait for a tow truck, reroute on a different path, change destination, combinations thereof, and the like.

These and other advantages of the present disclosure are provided in greater detail herein.

ILLUSTRATIVE EMBODIMENTS

The disclosure will be described more fully hereinafter with reference to the accompanying drawings, in which embodiments of the disclosure are shown, and not intended to be limiting.

Referring to FIG. 1, the vehicle 100 may take the form of a passenger or commercial automobile such as for example, a car, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas powered combustion engine with conventional drive components such as, a transmission, a drive shaft, a differential, and the like.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level 5 autonomy) or in one or more partial autonomy modes. Examples of partial autonomy modes are widely understood in the art as autonomy Levels 1 through 5.

Referring to FIG. 1, the vehicle 100 includes the vehicle control system 110. The vehicle control system 110 includes the vehicle computer 112, the camera system 114 including the camera 116, and the navigation (NAV) system 118' (GPS). The vehicle control system 110 is configured to provide vehicle data 120, including video data 122 from the camera 116 and vehicle location data 124 from the NAV system 118, to the remote vehicle control system 130 through the network 126.

The vehicle computer 112 may be or include an electronic vehicle controller. The vehicle computer 112 may be installed in an engine compartment of the vehicle 100 as schematically illustrated or elsewhere in the vehicle 100. The vehicle computer 112 includes a computer-readable memory 190 and one or more processor(s) 192.

The one or more processor(s) 192 may be disposed in communication with one or more memory devices disposed in communication with the respective computing systems (e.g., the memory 190 and/or one or more external databases 194). The processor(s) 192 may utilize the memory 190 to store programs in code and/or to store data for performing aspects of methods of the vehicle control system 110 in accordance with the disclosure.

The memory 190 may be a non-transitory computer-readable memory storing program code. The memory 190 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

As described in further detail below, the vehicle computer 112 may, in some example embodiments, be disposed in communication with one or more server(s) 194.

The vehicle control system 110 is configured to control vehicle systems (e.g., described in further detail below with respect to FIG. 15) based on control inputs 132 received from the remote vehicle control system 130 through the network 126. The remote vehicle control system 130 is configured to allow an operator to monitor and control one or more vehicles 100 in an intuitive manner.

The remote vehicle control system 130 includes the remote computer 134. The remote computer 134 includes a memory 140 and a processor 142. The description of the memory 190 and the processor 192 is generally applicable to the memory 140 and the processor 142, respectively.

The memory 140 includes geospatial, data 144, vehicle location data 124, the set of control actions 152, and the control inputs 132.

The processor 142 is configured to compile and format the geospatial data 144 to generate a digital image of the map 146 of a geographical area. The geospatial data 144 may include various layers including roadways and other points of interest such as buildings and other landmarks that may be geocoded for placement on a map.

In compiling and formatting the geospatial data 144, a geographic coordinate system. (e.g., latitude and longitude) of the geospatial data 144 may be converted to a projected coordinate system. The projected coordinate system is aligned with a screen coordinate system (e.g., the pixels of a screen of the horizontal display 136). For example, a selected geographic coordinate (e.g., a city center) is aligned with a center of the screen of the horizontal display 136 and additional geographic coordinates are aligned with the screen coordinate system based on a selected scale of the map 146. As another example, a selected geographic coordinate (e.g., the vehicle location data 124) is aligned with the fixed location 160 on the screen of the horizontal display 136 and the digital image of the map 146 is updated based on the position and orientation (e.g., the vehicle location data 124) of the vehicle 100.

The screen coordinate system is also a coordinate system for physical locations on the surface of the horizontal display 136. Accordingly, the geospatial data 144 are associated with physical locations on the surface of the horizontal display 136.

The remote vehicle control system 130 displays the vehicle graphics 148 on the map 146. Each vehicle graphic 148 corresponds to a vehicle 100 in a fleet of vehicles. The remote vehicle control system 130 receives the vehicle location data 124 (e.g., location, direction, speed) from the NAV system 118 and displays the vehicle graphic 148 on the map 146 based on the vehicle location data 124.

Figure 2:
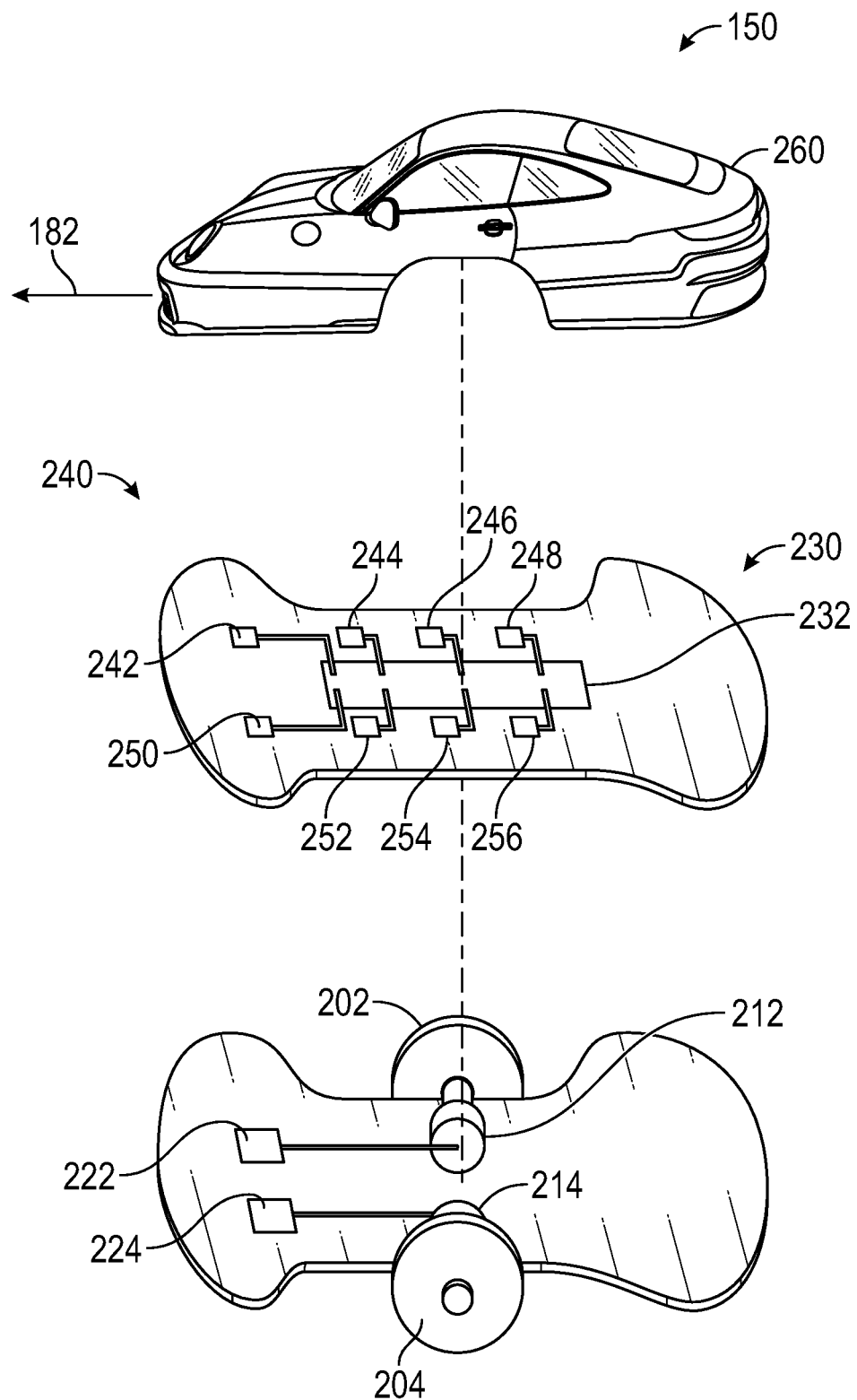
FIG. 2 depicts a control bot of the remote vehicle control system of FIG. 1 in accordance with the present disclosure.

The remote vehicle control system 130 includes controller hots 150 that are configured to move on the horizontal display 136. Referring to FIG. 2, an example controller bot 150 includes two parallel wheels 202, 204. The parallel wheels 202, 204 are independently driven by motors 212, 214. The motors 212, 214 are connected to encoders 222, 224 that measure the rotation of the wheels 202, 204.

The controller bots 150 may have other drive trains including a four-wheel drive, a six-wheel drive, an H-drive that uses four omni-directional wheels and a fifth omni-directional wheel set perpendicular between the other wheels of the drivetrain, and the like.

The controller bot 150 includes a circuit board 230 with a microcontroller 232 may include a memory, a processor, and programmable input/output peripherals 240 or connections thereto. The microcontroller 232 is configured to control and manage the peripherals 240 including the motors 212, 214, the encoders 222, 224, and other sensors and devices. For example, the peripherals 240 may include sensors and other devices such as wireless communication devices 242 (e.g., Bluetooth or Radio Frequency), light emitting diodes 244, optical sensors or cameras 246, color sensors 248 for detecting lines and colors, a compass 250, proximity sensors 252, an accelerometer 254 (or other vibration or force sensors), a gyroscope 256, and the like.

The controller bot 150 may include a vehicle-shaped housing 260. For example, the vehicle-shaped housing 260 may be 3D printed. The housing 260 may be shaped to provide directional information to, the operator.

The position of the controller bot 150 on the horizontal display 136 may be determined based on the odometry (e.g., with the encoders 222, 224) and the distance each wheel 202, 204 travels. The controller bot 150 and/or the remote vehicle control system 130 may additionally or alternatively determine the position of the controller bot 150 on the horizontal display 136, for example, using other peripherals 240 including inertial navigation systems (e.g., with the accelerometer 254 and the gyroscope 256), with beacons (e.g., using triangulation or trilateration), with a magnetic compass 250, cameras 246 or color sensors 248 (e.g., matching a local map to global map), combinations thereof, and the like.

The controller bot 150 is configured to communicate with the remote computer 134 via a peripheral 240 such as the wireless communication device. For example, the controller bot 150 is configured to receive the position 170 and direction 172 of the vehicle graphic 148 and the position 180 and direction 182 of the controller bot 150. The controller bot 150 is configured to navigate the surface of the horizontal display 136 based on positional information from the remote computer 134 and/or based on measurements from peripherals 240 such as the optical sensors or cameras 246, color sensors 248, compass 250, and proximity sensor 252.

The controller bot 150 is configured to measure an action performed on or with the controller bot 150 based on measurements from peripherals 240 including the encoders 222, 224, the compass 250, the accelerometer 254, the gyroscope 256, and the like.

Figure 3:
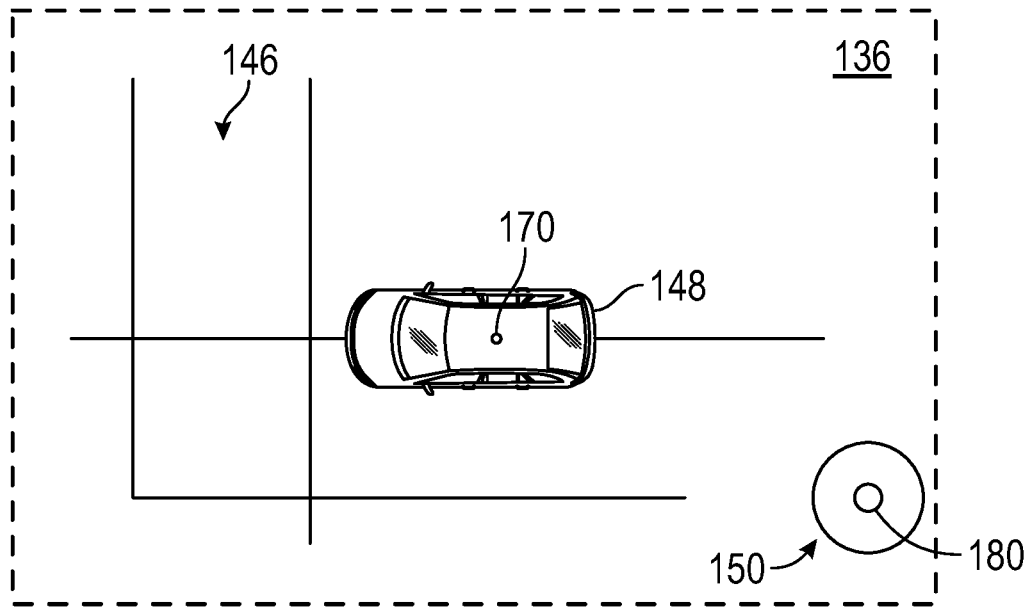
FIGS. 3 and 4 depict a method of linking a vehicle, and a control bot including moving the control bot to a vehicle graphic associated with the vehicle in accordance with the present disclosure.
Figure 4:
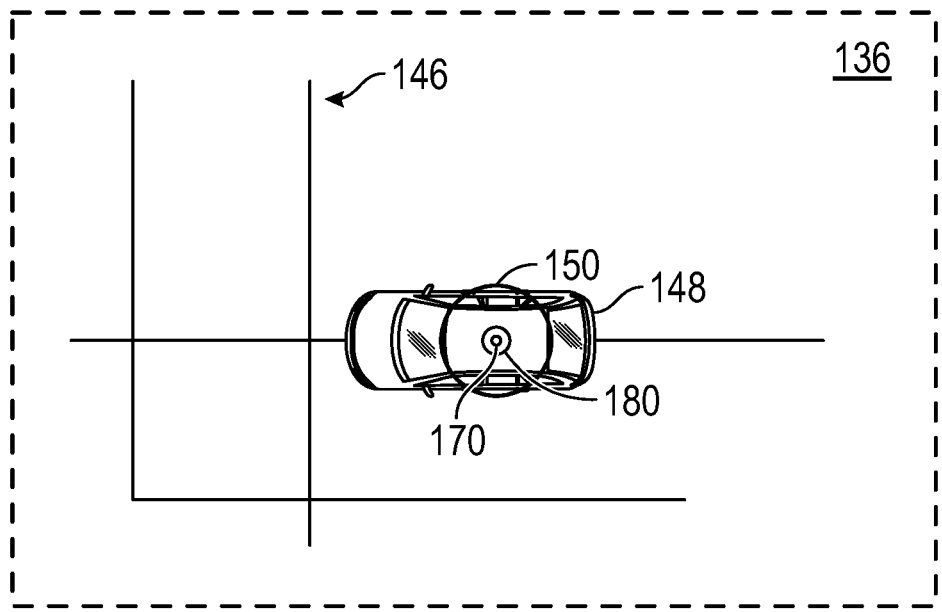

Referring to FIGS. 3 and 4, the controller hots 150 (represented in FIGS. 3-6 and 8-14 as a circle) are configured to link to a vehicle 100. For example, a controller bot 150 may be linked to a vehicle 100 when the position 180 of the controller bot 150 matches the position 170 of the vehicle graphic 148 of the associated vehicle 100 for a threshold amount of time. In FIG. 3, the position 180 of the controller bot 150 is spaced apart from the position 170 of the vehicle graphic 148. In FIG. 4, the position 180 of the controller bot 150 matches the position 170 of the vehicle graphic 148 to link the controller hot 150 to the vehicle 100.

Alternatively or additionally, to link a controller bot 150 to a vehicle 100, the controller bot 150 may read a visual code that is part of the vehicle graphic 148 with an optical sensor, color sensor 248; or camera 246.

When the controller bot 150 is linked to a vehicle 100, the controller hot 150 may track or follow the associated vehicle graphic 148 as the vehicle graphic 148 moves on the horizontal display 136 based on the vehicle location data 124. For example, the remote vehicle control system 130 or the controller hot 150 may determine the distance and direction between the position 180 of the controller hot 150 and the position 170 of the vehicle graphic 148, and use a proportional-integral-derivative (PID) controller to determine the corresponding controls for the motors 212, 214 to move the controller bot 150 in the direction of the vehicle graphic 148, at a speed determined by the PID controller, until a distance between the controller bot 150 and the vehicle graphic 148 is zero.

By linking the controller bot 150 to a vehicle 100, the location and movements of the vehicle 100 can be easily monitored via monitoring the controller hot 150 on the map 146. A single operator using the remote vehicle control system 130 can monitor a fleet of vehicles.

Figure 5:
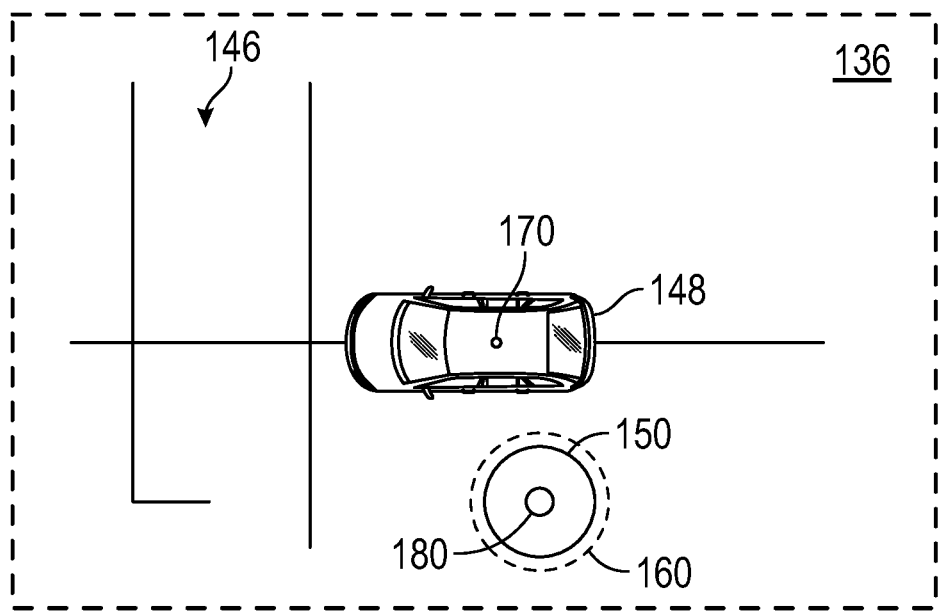
FIGS. 5 and 6 depict the remote control bot at a fixed location in accordance with the present disclosure.

Referring to FIG. 5, in some examples, when the controller bot 150 is linked to the vehicle 100, the controller bot 150 is anchored or positioned in the fixed location 160 and anchored or oriented in the fixed direction 162. The fixed location 160 may provide more convenient access to controller bot 150 by an operator.

When the controller bot 150 is linked to a vehicle 100, the controller hot 150 is configured to be used to control the vehicle 100. To initiate control of a vehicle 100 through a control hot 150 that is linked to the vehicle 100, the linked control bot 150 may first be selected. Here, on/off selection may be used so that only those vehicles 100 that require assistance are actively controlled. In some examples, selective linking is used so that only those vehicles 100 that require assistance are actively controlled.

The control bet 150 may be tapped or depressed to select the control bot 150. The control bot 150 may measure the tapping or pressing of the control bot 150 with the accelerometer 254. Registering the measurement activates a control mode to control the vehicle 100 with the control bot 150. Alternatively, linking the controller bot 150 to the vehicle 100 may automatically activate a control mode.

Figure 6:
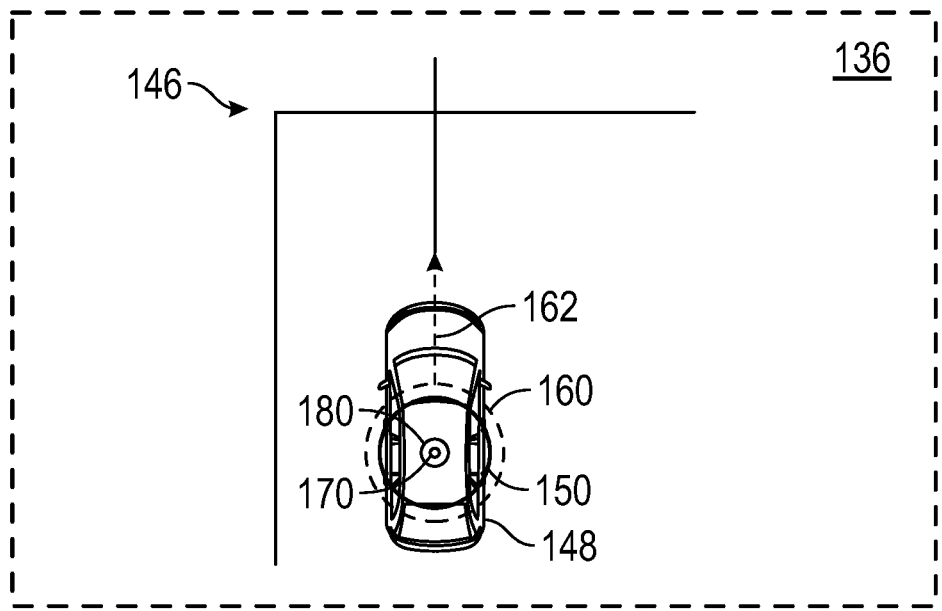

Referring to FIG. 6, in some examples where the controller bot 150 is linked or selected, the controller bot 150 and the vehicle graphic 148 are anchored or positioned in the fixed location 160 (e.g., where the selection occurs or at a pre-designated location) and anchored or oriented in a fixed direction 162. Here, the map 146 is generated around the fixed location 160 and in the fixed direction 162 based on the vehicle location data 124. For example, geographic coordinates are aligned with the screen coordinate system based on the fixed location 160, the fixed direction 162, and a selected scale of the map 146.

Figure 7:
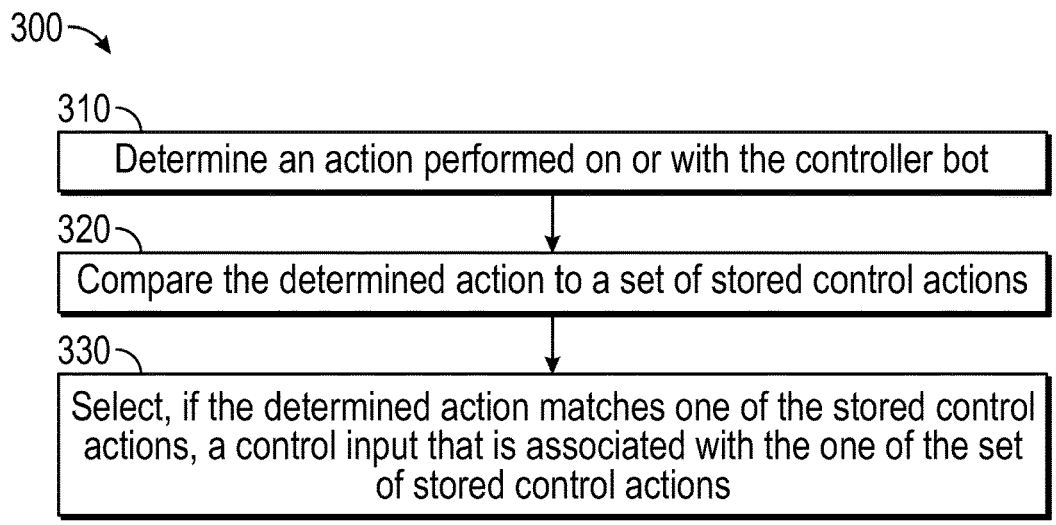
FIG. 7 depicts a method of controlling a vehicle with a remote vehicle control system in accordance with the present disclosure.

Once the control bot 150 is linked and/or selected to activate a control mode, the remote vehicle control system 130 is configured to perform a method 300. Referring to FIG. 7 and according to a first step 310, the remote vehicle control system 130 determines an action performed on or with the controller bot 150. According to a second step 320, the remote vehicle control system 130 compares the determined action to a set of stored control actions 152. According to a third step 330, if the determined action matches one of the stored control actions 152, a control input 132 that is associated with the one of the set of stored control actions 152 is selected as a control input 132 for the associated vehicle 100.

The controller bot 150 may measure various actions performed on or with the control bot 150 including, a direction and an amount of translational movement, a direction and an amount of rotational movement, a number of force inputs and/or taps, combinations thereof, and the like. The actions may be determined from measurements from peripherals 240 including the encoders 222, 224, the accelerometer 254, the gyroscope 256, the compass 250, and the like.

Actions performed on or with the controller bot 150 may be measured relative to the position 170 and orientation (e.g., the forward direction 172) of the vehicle graphic 148 and/or may be measured relative to the fixed location 160 and fixed direction 162. In examples where the control bot 150 is anchored to the fixed location 160, the position 170 of the vehicle graphic 148 may be at the fixed location 160 with the forward direction 172 aligned with the fixed direction 162.

The distance and direction between a position 180 of the controller bot 150 and position 170 of the vehicle graphic 148 may at least partially define a control action 152. Similarly, an angle between a forward direction 182 of the controller bot 150 and the forward direction 172 of the vehicle graphic 148 may at least partially define a control action 152.

The peripherals 240 may measure distance and direction of translational movement of the controller bot 150 and angle of rotational movement of the controller bot 150. For example, the encoders 222, 224 may measure movement of the wheels 202, 204 in the same direction to register an amount of translational movement in a forward or reverse direction. The encoders 222, 224 may measure movement of the wheels 202, 204 in opposite directions to register an amount of rotational movement in a clockwise or counterclockwise direction.

The controller bot 150 may control the motors 212, 214 to provide an opposite resistive force to a rotation or translation of the control bot 150 (e.g., to create a spring like mechanism). The resistive force provides an improved tactile user interface and returns the control bot 150 to an original orientation and/or location (e.g., that of the vehicle graphic 148 or fixed position 160), for example, after an action performed on or with the control bot 150 is confirmed to match a stored control action 152.

The stored control actions 152 are associated with control inputs 132. Referring to FIGS. 8-11, stored control actions 152 are associated with control inputs 132 that directly control the actions of the vehicle 100. Control inputs 132 that directly control the actions of the vehicle 100 may be related to steering, accelerating, and braking. For example, the control inputs 132 may include changing lane, turning left or right, accelerating or decelerating, and, the like.

Figure 8:
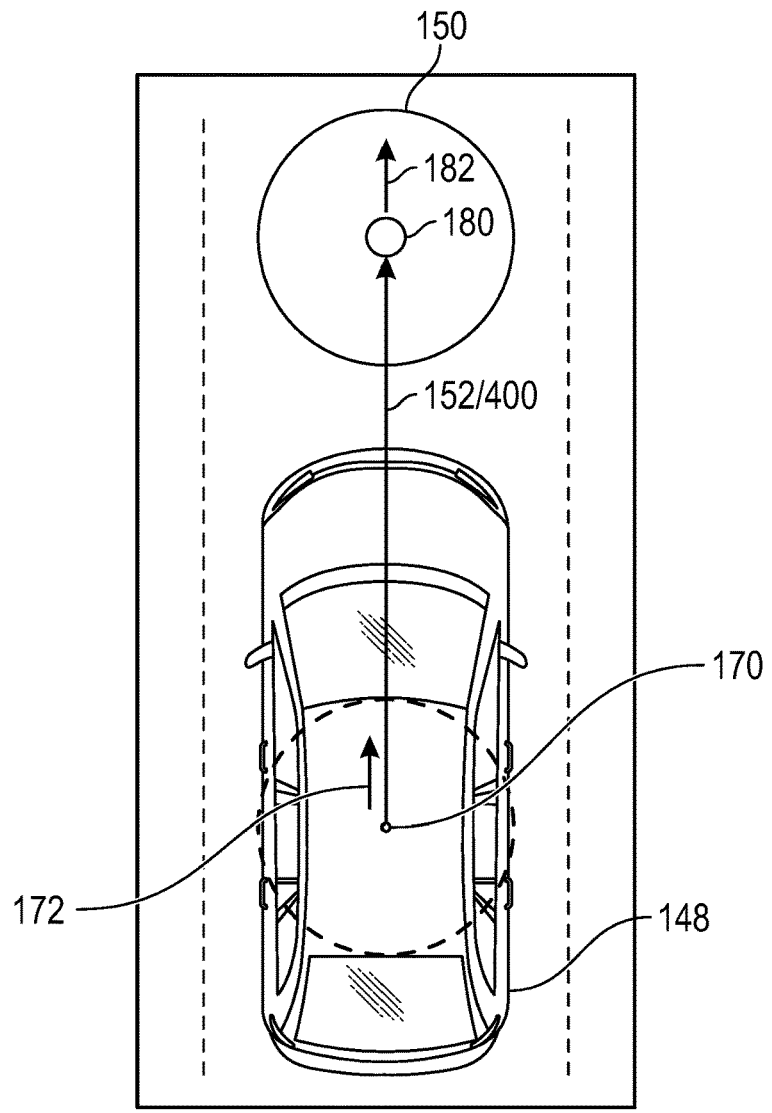

Referring to FIG. 8, a first stored control action 152 may be a translational movement of the controller bot 150 in the forward direction 400 (e.g., the direction 172 or 182) that corresponds to an acceleration control input 132. Referring to FIG. 9, a second stored control action 152 may be a translational movement of the controller bot 150 in the reverse direction 410 (e.g., opposite the direction 172 or 182) that corresponds to a deceleration control input 132.

Referring to FIG. 10, a third stored control action 152 may be a translational movement of the controller bot 150 in the right direction 420 that corresponds to a lane change control input 132. A lane change is illustrated in FIG. 10 with the vehicle graphic 148 following the movement of the control bot 150 from a first lane 422 to a second lane 424.

Figure 11:
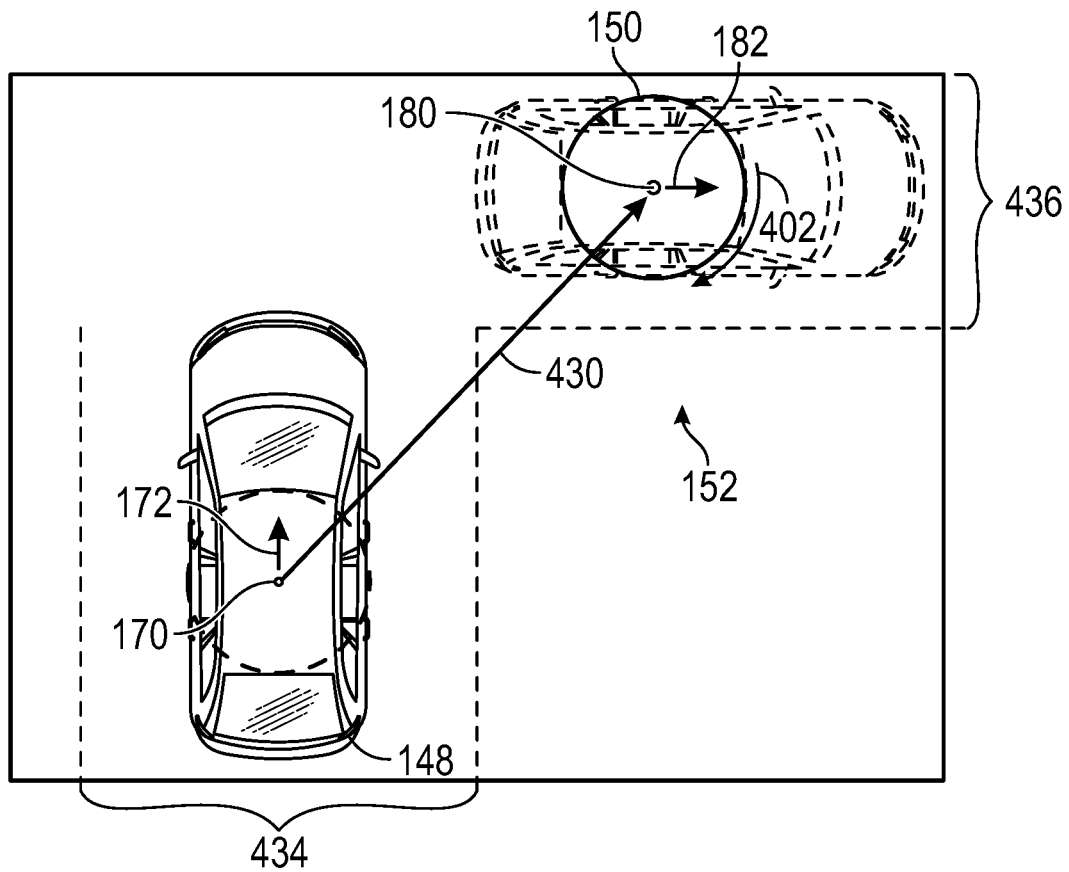

Referring to FIG. 11, a fourth stored control action 152 may be a translational movement of the controller bot 150 forward and to the right (e.g., in a diagonal forward direction 430) and a rotational movement of the controller hot 150 ninety degrees in a clockwise direction 432. The fourth stored control action 152 corresponds to a right turn control input 132. A right turn is illustrated in FIG. 11 with the vehicle graphic 148 following the movement and direction of the control bot 150 while turning from a first street 434 onto a second street 436.

Control inputs 132 may also include broader control inputs from which the remote computer 134 or the vehicle computer 112 determines steps to achieve a desired result. For example, broader control inputs 132 may include a request to pull over, stop at a refueling station, wait for a tow truck, reroute on a different path, change destination, combinations thereof, and the like.

Figure 12:
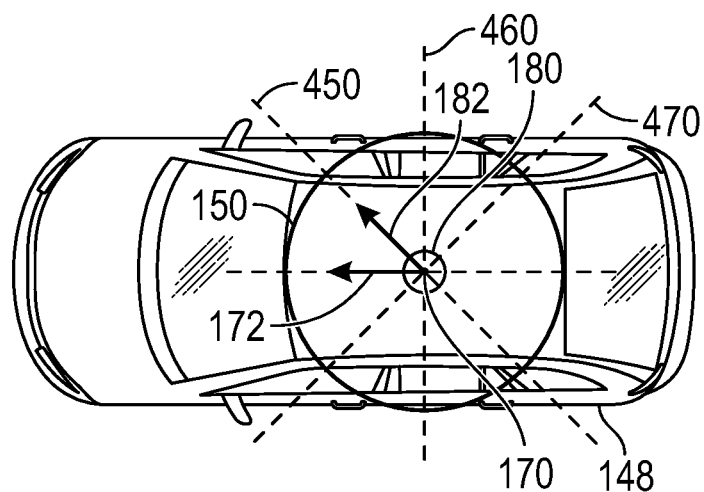
FIGS. 12-13 depict actions performed on or with the remote control bot in accordance with the present disclosure.
Figure 13:
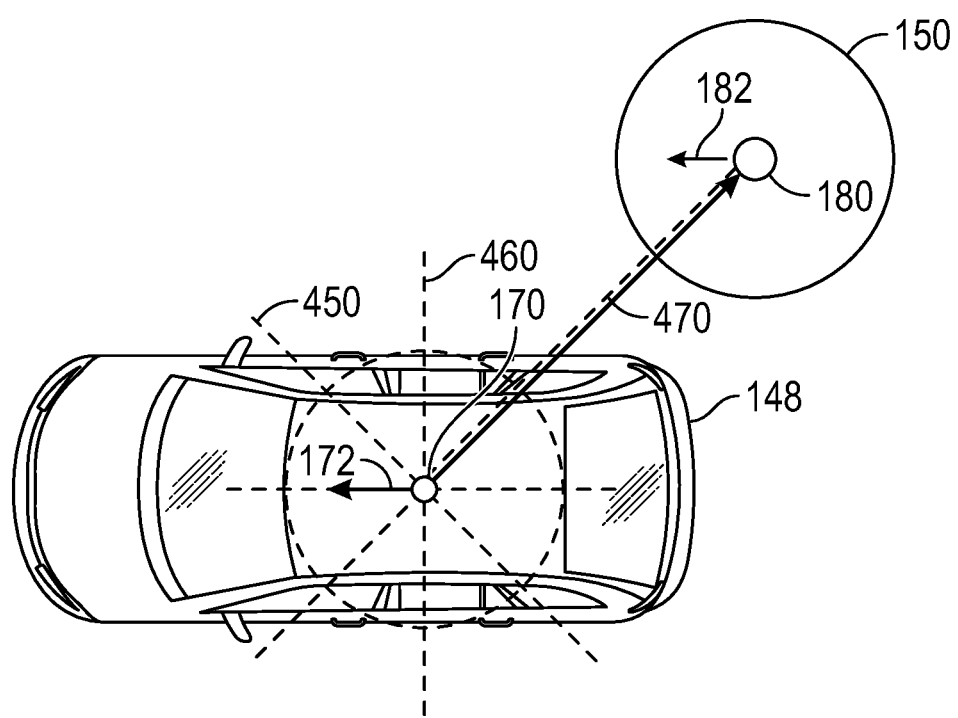

Referring to FIGS. 12 and 13, broad control inputs 132 may be associated with a stored control action 152 that indicates an angle. Here, the controller bot 150 may be rotated to scroll through different control inputs 132. Referring to FIG. 12, a fifth stored control action 152 may be a forty five degree rotation 450 of the controller bot 150, a sixth stored control action 152 may be a ninety degree rotation 460 of the controller bot 150, a seventh stored control action 152 may be a one hundred thirty five degree rotation 470 of the controller bot 150, and so on. Referring to FIG. 13, an angle is indicated by a translational motion of the controller bot 150. An eighth stored control action 152 may be a translational motion of the controller bot 150 in a direction that is at an angle of one hundred thirty five degrees.

The controller bot 150 may provide tactile detents or other feedback (e.g., a haptic signal such as vibration or a light signal) when an action that is performed on or with the controller bot 150 matches a stored control action 152. For example, the controller bot 150 may vibrate when it is rotated to an angle that is associated with a stored control action 152. The operator may confirm selection of the matched control action 152 (e.g., by maintaining the action for a period of time or by a second action) before the associated control input 132 is selected to control the vehicle 100.

Figure 14:
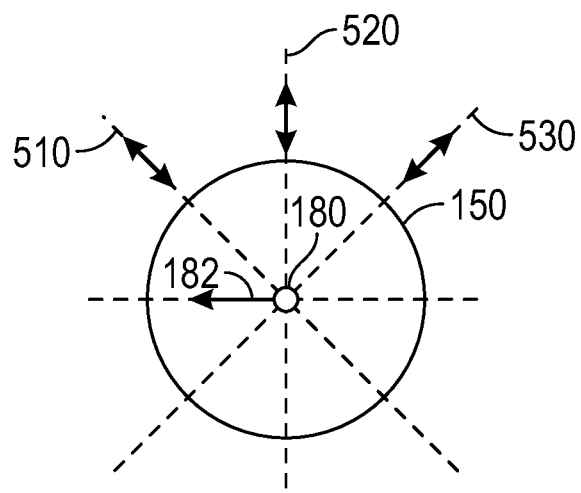
FIG. 14 depicts alerts generated by the remote control bot in accordance with the present disclosure.

Additionally, referring to FIG. 14, the controller bot 150 may provide alerts or information while following the vehicle graphic 148, for example, to alert an operator that assistance is needed. The controller bot 150 may indicate an alert or information through movement or vibration at a certain angle. Referring to FIG. 14, a first alert is indicated by movement of the controller bot 150 at a first angle 510, a second alert is indicated by movement of the controller bot 150 at a second angle 520, and a third alert is indicated by movement of the controller bot 150 at a third angle 530.

Figure 15:
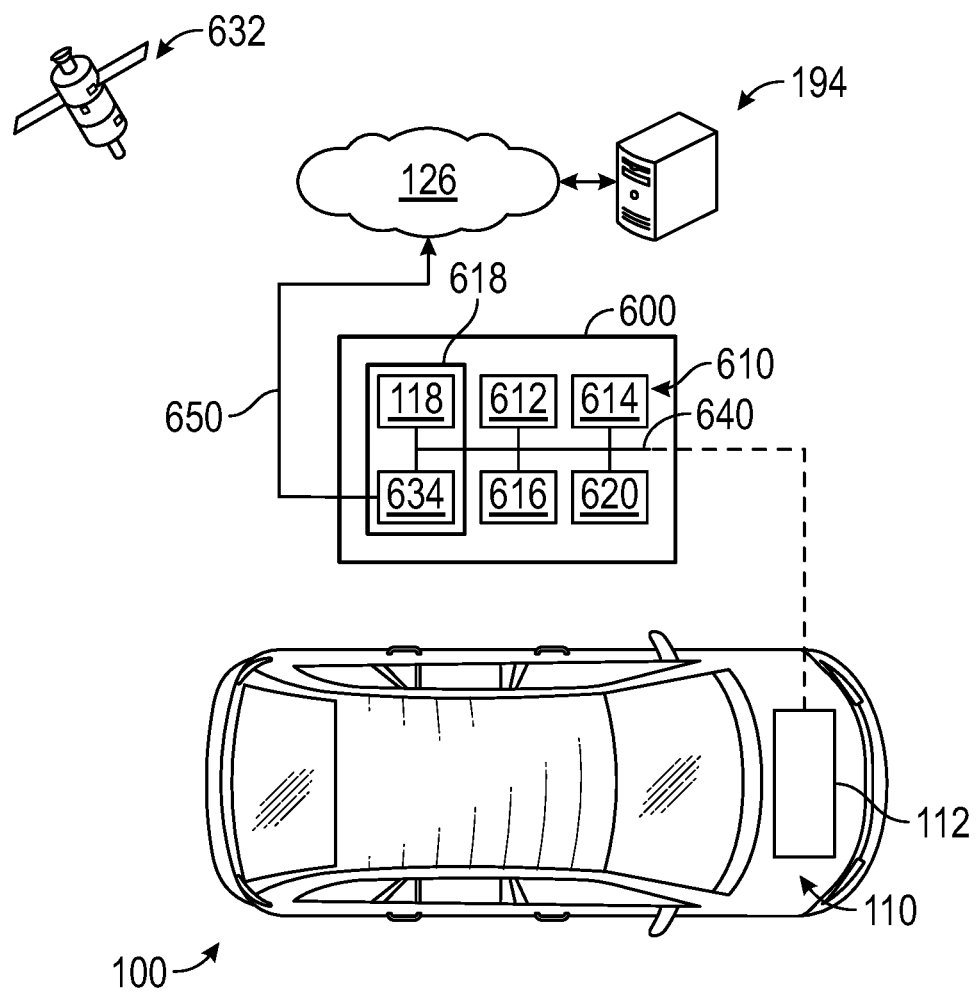
FIG. 15 depicts the vehicle of FIG. 1 with vehicle systems in accordance with the present disclosure.

Referring to FIG. 15, vehicle systems are described in greater detail. The vehicle 100 includes a Vehicle Controls Unit (VCU) 600. The VCU 600 includes a plurality of electronic control units (ECUs) 610 disposed in communication with the vehicle computer 112.

The VCU 600 may coordinate the data between vehicle systems, connected servers (e.g., the server(s) 194), and other vehicles operating as part of a vehicle fleet. The VCU 600 can include or communicate with any combination of the ECUs 610, such as, for example, a Body Control Module (BCM) 612, an Engine Control Module (ECM) 614, a Transmission Control Module (TCM) 616, a Telematics Control Unit (TCU) 618, a Restraint Control Module (RCM) 620, and the like.

The VCU 600 may control aspects of the vehicle 100, and implement one or more instruction sets (e.g., a control input 132) received from the remote vehicle control system 130 and/or from instructions received from a vehicle system controller (such as vehicle computer 112 described above).

The TCU 618 can be configured to provide vehicle connectivity to wireless computing systems onboard and of board the vehicle 100 and is configurable for wireless communication between the vehicle 100 and other systems, computers, and modules. For example, the TCU 618 includes the Navigation (NAV) system 118 for receiving and processing a GPS signal from a GPS 632, a Bluetooth® Low-Energy Module (BLEM) 634, a Wi-Fi transceiver, an Ultra-Wide Band (UWB) transceiver, and/or other wireless transceivers.

The NAV system 118 may be configured and/or programmed to determine a position of the vehicle 100. The NAV system 118 may include a Global Positioning System (GPS) receiver configured or programmed to triangulate the position of the vehicle 100 relative to satellites or terrestrial based transmitter towers associated with the GPS 632. The NAV system 118, therefore, may be configured or programmed for wireless communication.

The NAY system 118 may be further configured or programmed to develop routes from a current location to a selected destination, as well as display a map and present driving directions to the selected destination via, e.g., a user interface. In some instances, the NAV system 118 may develop the route according to a user preference. Examples of user preferences may include maximizing fuel efficiency, reducing travel time, travelling the shortest distance, or the like.

The TCU 618 generally includes wireless transmission and communication hardware that may be disposed in communication with one or more transceivers associated with telecommunications towers and other wireless telecommunications infrastructure. For example, the BLEM 634 may be configured and/or programmed to receive messages from, and transmit messages to, one or more cellular towers associated with a telecommunication provider, and/or and a Telematics Service Delivery Network (SDN) associated with the vehicle 100 for coordinating vehicle fleet.

The TCU 618 may be disposed in communication with the ECUs 610 by way of a Controller Area Network (CAN) bus 640. In some aspects, the TCU 618 may retrieve data and send data as a CAN bus 640 node.

The BLEM 634 may establish wireless communication using Bluetooth® and Bluetooth Low-Energy® communication protocols by broadcasting and/or listening for broadcasts of small, advertising packets, and establishing connections with responsive devices that are configured according to embodiments described herein. For example, the BLEM 634 may include Generic Attribute Profile. (GATT) device connectivity for client devices that respond to or initiate GATT commands and requests, and connect directly with a mobile device.

The CAN bus 640 may be configured as a multi-master serial bus standard for connecting two or more of the ECUs 610 as nodes using a message-based protocol that can be configured and/or programmed to allow the ECUs 610 to communicate with each other. The CAN bus 640 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 610 may communicate with a host computer (e.g., the vehicle computer 112, the remote computer 134, and/or the server(s) 194, etc.), and may also communicate with one another without the necessity of a host computer.

The server(s) 194 may be part of a cloud-based computing infrastructure, and may be associated with and/or include a Telematics Service Delivery Network (SDN) that provides digital data services to the vehicle 100 and other vehicles that may be part of a vehicle fleet.

The CAN bus 640 may connect the ECUs 610 with the vehicle computer 112 such that the vehicle computer 112 may retrieve information from, send information to, and otherwise interact with the ECUs 610 to perform steps described according to embodiments of the present disclosure. The CAN bus 640 may connect CAN bus nodes (e.g., the ECUs 610) to each other through a two-wire bus, which may be a twisted pair having a nominal characteristic impedance. The CAN bus 640 may also be accomplished using other communication protocol solutions, such as Media Oriented Systems Transport (MOST) or Ethernet. In other aspects, the CAN bus 640 may be a wireless intra-vehicle CAN bus.

The VCU 600 may control various loads directly via the CAN bus 640 communication or implement such control in conjunction with the BCM 612. The ECUs 610 described with respect to the VCU 600 are provided for exemplary purposes only, and are not intended to be limiting or exclusive. Control and/or communication with other control modules is possible, and such control is contemplated.

The ECUs 610 may control aspects of vehicle operation and communication using inputs from human drivers, inputs from the vehicle control system 110, and/or via wireless signal inputs received via wireless channel(s) 650 from other connected devices such as a mobile device, among others. The ECUs 610, when configured as nodes in the CAN bus 640, may each include a central processing unit (CPU), a CAN controller, and/or a transceiver.

The BCM 612 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 612 may also operate as a gateway for bus and network interfaces to interact with remote ECUs.

The BCM 612 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 612 may be configured for vehicle energy management, exterior lighting control, wiper functionality, power window and door functionality, heating ventilation and air conditioning systems, and driver integration systems. In other aspects, the BCM 612 may control auxiliary equipment functionality, and/or is responsible for integration of such functionality. In one aspect, a vehicle having a vehicle control system 110 may integrate the system using, at least in part, the BCM 612.

The network(s) 126 illustrate an example of an example communication infrastructure in which the connected devices discussed in various embodiments of this disclosure may communicate. The network(s) 126 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or may, unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A remote vehicle control system, comprising:
a horizontal display comprising a horizontal surface;
a controller bot on the horizontal surface;
a processor; and
a memory, comprising computer executable instructions that, when executed by the processor, causes the processor to:
   display on the horizontal surface:
      a digital image of a map of a geographical area; and
      a vehicle graphic at a location on the map, wherein the location of the vehicle graphic on the map is determined based on vehicle location data received from a vehicle;

determine an action performed on or with the controller bot;
compare the determined action to a set of stored control actions;
determine, if the determined action matches one of the set of stored control actions, a control input that is associated with the one of the set of stored control actions; and
provide, if the determined action matches the one of the set of stored control actions, an alert at the controller bot, wherein the alert comprises a tactile detent or a feedback.

2. The remote, vehicle control system of claim 1, wherein the controller bot is configured to link to the vehicle.

3. The remote vehicle control system of claim 1, wherein a position and direction of the controller bot are anchored to a position and direction of the vehicle graphic.

4. The remote vehicle control system of claim 3, wherein control bot is configured to move on the horizontal surface with movement of the vehicle graphic.

5. The remote vehicle control system of claim 3, wherein the position and direction of the controller bot and the position and direction of the vehicle graphic are anchored to a fixed position and direction.

6. The remote vehicle control system of claim 1, wherein the controller bot is anchored to a fixed position on the horizontal surface.

7. The remote vehicle control system of claim 1, wherein the controller bot is configured to be selected to activate a control mode.

8. The remote vehicle control system of claim 1, wherein video data from a camera in the vehicle is displayed on at least one of the horizontal display and a vertical display.

9. The remote vehicle control system of claim 1, wherein the controller bot is configured to measure a least one of a translational movement, a rotational movement, and a number of force inputs.

10. The remote vehicle control system of claim 1, wherein an action performed on or with the controller bot is measured relative to at least one of the position and the orientation of the vehicle graphic.

11. The remote vehicle control system of claim 1, wherein an action performed on or with the controller bot is measured relative to at least one of a fixed location and a fixed direction.

12. The remote vehicle control system of claim 1, wherein an action performed on or with the controller bot is at least partially measured by a direction from a position of the vehicle graphic to a position of the controller hot.

13. The remote vehicle control system of claim 1, wherein an action performed on or with the controller bot is at least partially measured by an angle between a forward direction of the control bot and a forward direction of the vehicle graphic.

14. The remote vehicle control system of claim 1, wherein the control input is configured to cause the vehicle to at least one of change lane, turn left, turn right, accelerate, and decelerate.

15. The remote vehicle control system of claim 1, further comprising a navigation system of the vehicle, wherein the navigation system is configured to provide the vehicle location data to the processor.

16. The remote vehicle control system of claim 1, wherein the memory comprises computer executable instructions that, when executed by the processor, causes the processor to display a plurality of vehicle graphics at locations on the map, wherein the locations of the vehicle graphics on the map are based on vehicle location data received from a plurality of vehicles.

17. The remote vehicle control system of claim 1, wherein the controller bot is configured to provide a feedback signal when an action that is performed on or with the controller bot matches a stored control action.

18. The remote vehicle control system of claim 1, wherein the alert is a vibration at an angle that is measured relative to a forward direction of the controller bot.

19. A remote vehicle control system, comprising:
a processor; and
a memory, comprising computer executable instructions that, when executed by the processor, causes the processor to:
display, on a horizontal surface:
a digital image of a map of a geographical area; and
a vehicle graphic at a location on the map, wherein the location of the vehicle graphic on the map is determined based on vehicle location data received from a vehicle;
determine an action performed on or with a controller bot;
compare the determined action to a set of stored control actions;
determine, if the determined action matches one of the set of stored control actions, a control input that is associated with the one of the set of stored control actions; and
provide, if the determined action matches the one of the set of stored control actions, an alert at the controller bot, wherein the alert comprises a tactile detent or a feedback.

* * * * *